US012737479B2

(12) United States Patent
Singh Dilip Thakur et al.

(10) Patent No.: US 12,737,479 B2
(45) Date of Patent: Sep. 15, 2026

(54) METHODS AND SYSTEMS FOR ESTIMATING RISK OF ENTERPRISE APPLICATION FOR QUANTUM CRYPTOGRAPHY MIGRATION

(71) Applicant: Tata Consultancy Services Limited, Mumbai (IN)

(72) Inventors: Meena Singh Dilip Thakur, Bengaluru (IN); Habeeb Basha Syed, Hyderabad (IN); Kumar Mansukhlal Vidhani, Gandhinagar (IN); Rajan Mindigal Alasingara Bhattachar, Bangalore (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 99 days.

(21) Appl. No.: 18/826,572

(22) Filed: Sep. 6, 2024

(65) Prior Publication Data

US 2025/0284818 A1 Sep. 11, 2025

(30) Foreign Application Priority Data

Oct. 6, 2023 (IN) ............................ 202321067239

(51) Int. Cl.
*G06F 21/57* (2013.01)
*H04L 9/08* (2006.01)

(52) U.S. Cl.
CPC .......... *G06F 21/577* (2013.01); *H04L 9/0877* (2013.01); *G06F 2221/033* (2013.01)

(58) Field of Classification Search
CPC ............................ G06F 21/577; H04L 9/0877
See application file for complete search history.

(56) References Cited

U.S. PATENT DOCUMENTS 11,218,300 B1 * 1/2022 Shea .................... H04L 9/0897
11,223,470 B1 * 1/2022 Shea .................... H04L 9/3297
(Continued)

FOREIGN PATENT DOCUMENTS

CN 101436240 A 5/2009

OTHER PUBLICATIONS

Chujiao Ma, et al., CARAF: Crypto Agility Risk Assessment Framework, Journal of Cybersecurity 2021, Oxford University Press, 1-11 (Year: 2021).*
(Continued)

*Primary Examiner* — Vance M Little
(74) *Attorney, Agent, or Firm* — FINNEGAN, HENDERSON, FARABOW, GARRETT & DUNNER LLP

(57) ABSTRACT

The disclosure generally relates to methods and systems for estimating risk of enterprise application for quantum cryptography migration. Conventional software risk assessment tools that assess the quantum computer related security attacks are limited. The present disclosure solves the technical problems in the art for estimating risk of enterprise application for quantum cryptography migration. The methods and systems of the present disclosure formulated the problem based on a survival function in the probability theory, where possible chances of the enterprise application crypto surviving the quantum computer are calculated, and an estimated risk value is assigned to the enterprise software application. The methods and systems of the present disclosure discloses a risk estimator which take enterprise application specific metadata as the inputs and produces the risk score associated to the enterprise application against the quantum threats using a modified cox model and a modified rule of Mosca.

13 Claims, 7 Drawing Sheets

(56) References Cited

U.S. PATENT DOCUMENTS

| | | | | |
|---|---|---|---|---|
| 2018/0137288 | A1 | 5/2018 | Polyakov | |
| 2020/0244706 | A1* | 7/2020 | Young | G06Q 10/06393 |

OTHER PUBLICATIONS

Siv Hilde Houmb, and Virginia Franqueira, Estimating ToE Risk Level using CVS, 2009 International Conference on Availability, Reliability and Security, IEEE Computer Society, 718-725 (Year: 2009).*

Lukas Malina, et al., Post-Quantum Era Privacy Protection for Intelligence Infrastructures, IEEE Access vol. 9, 2021, Mar. 8, 2021, 36038-36077 (Year: 2021).*

Nagaraju et al., "Optimal Test Activity Allocation for Covariate Software Reliability and Security Models," (2020).

* cited by examiner

METHODS AND SYSTEMS FOR ESTIMATING RISK OF ENTERPRISE APPLICATION FOR QUANTUM CRYPTOGRAPHY MIGRATION

PRIORITY CLAIM

This U.S. patent application claims priority under 35 U.S.C. § 119 to: Indian Patent Application number 202321067239, filed on Oct. 6, 2023. The entire contents of the aforementioned application are incorporated herein by reference.

TECHNICAL FIELD

The disclosure herein generally relates to an enterprise application risk assessment, and, more particularly, to methods and systems for estimating risk of enterprise application for quantum cryptography migration.

BACKGROUND

Quantum computing has advanced as a full-fledged technology with the recent developments in the present decade. After the full-fledged quantum computer implementation, the quantum computing can be used for attacking/breaking the security of software applications. With the quantum threat looming in, there is an imminent need to assess security posture of the current software applications and perform to course correction. A security assessment procedure must include the risk analysis of the software application based on application specific parameters to ascertain that the current software applications can withstand any attacks from quantum computer before the migration. Hence the software risk assessment tools need to be carried out to realize the software applications that can withstand the attacks from the quantum computer. However, conventional software risk assessment tools that assess the quantum computer related security attacks are limited and there is a scope of improvement in terms of efficiency and accuracy.

SUMMARY

Embodiments of the present disclosure present technological improvements as solutions to one or more of the above-mentioned technical problems recognized by the inventors in conventional systems.

In an aspect, a processor-implemented method for estimating risk of enterprise application for quantum cryptography migration is provided. The method including the steps of: defining, one or more application risk input parameters, one or more platform risk input parameters, and one or more risk policy input parameters, for a host enterprise application; receiving, an application related data of the host enterprise application, a data shelf life of the application related data of the host enterprise application, a time to migrate the host enterprise application whose risk is to be estimated from a quantum threat after migration, and a time by which quantum computer manufactured; extracting, an input parameter value of each of the one or more application risk input parameters, the one or more platform risk input parameters, and the one or more risk policy input parameters, from the application related data of the host enterprise application whose risk is to be estimated from the quantum threat, using a data extraction technique; computing, a hazard value for each of the one or more application risk input parameters, the one or more platform risk input parameters, and the one or more risk policy input parameters, based on an associated input parameter value, using a modified cox model; estimating, a hazard risk value of the host enterprise application, based on the hazard value computed for each of the one or more application risk input parameters, the one or more platform risk input parameters, and the one or more risk policy input parameters; determining, a Mosca risk value of the host enterprise application, based on the data shelf life of application related data of the host enterprise application, the time to migrate the host enterprise application, and the time by which quantum computer manufactured, using a rule of Mosca; calculating, a cumulative risk value of the host enterprise application, using the hazard risk value of the host enterprise application and the Mosca risk value of the host enterprise application; and evaluating, the risk of the host enterprise application for quantum cryptography migration, based on the cumulative risk value of the host enterprise application and an average cumulative risk value.

In another aspect, a system for estimating risk of enterprise application for quantum cryptography migration is provided. The system includes: a memory storing instructions; one or more Input/Output (I/O) interfaces; and one or more hardware processors coupled to the memory via the one or more I/O interfaces, wherein the one or more hardware processors are configured by the instructions to: define one or more application risk input parameters, one or more platform risk input parameters, and one or more risk policy input parameters, for a host enterprise application; receive an application related data of the host enterprise application, a data shelf life of the application related data of the host enterprise application whose risk is to be estimated from a quantum threat after migration, a time to migrate the host enterprise application, and a time by which quantum computer manufactured; extract an input parameter value of each of the one or more application risk input parameters, the one or more platform risk input parameters, and the one or more risk policy input parameters, from the application related data of the host enterprise application whose risk is to be estimated from the quantum threat, using a data extraction technique; compute a hazard value for each of the one or more application risk input parameters, the one or more platform risk input parameters, and the one or more risk policy input parameters, based on an associated input parameter value, using a modified cox model; estimate a hazard risk value of the host enterprise application, based on the hazard value computed for each of the one or more application risk input parameters, the one or more platform risk input parameters, and the one or more risk policy input parameters; determine a Mosca risk value of the host enterprise application, based on the data shelf life of application related data of the host enterprise application, the time to migrate the host enterprise application, and the time by which quantum computer manufactured, using a rule of Mosca; calculate a cumulative risk value of the host enterprise application, using the hazard risk value of the host enterprise application and the Mosca risk value of the host enterprise application; and evaluate the risk of the host enterprise application for quantum cryptography migration, based on the cumulative risk value of the host enterprise application and an average cumulative risk value.

In yet another aspect, there are provided one or more non-transitory machine-readable information storage mediums comprising one or more instructions which when executed by one or more hardware processors cause: defining one or more application risk input parameters, one or more platform risk input parameters, and one or more risk policy input parameters, for a host enterprise application; receiving an application related data of the host enterprise application, a data shelf life of the application related data of the host enterprise application, a time to migrate the host enterprise application whose risk is to be estimated from a quantum threat after migration, and a time by which quantum computer manufactured; extracting an input parameter value of each of the one or more application risk input parameters, the one or more platform risk input parameters, and the one or more risk policy input parameters, from the application related data of the host enterprise application whose risk is to be estimated from the quantum threat, using a data extraction technique; computing a hazard value for each of the one or more application risk input parameters, the one or more platform risk input parameters, and the one or more risk policy input parameters, based on an associated input parameter value, using a modified cox model; estimating a hazard risk value of the host enterprise application, based on the hazard value computed for each of the one or more application risk input parameters, the one or more platform risk input parameters, and the one or more risk policy input parameters; determining a Mosca risk value of the host enterprise application, based on the data shelf life of application related data of the host enterprise application, the time to migrate the host enterprise application, and the time by which quantum computer manufactured, using a rule of Mosca; calculating a cumulative risk value of the host enterprise application, using the hazard risk value of the host enterprise application and the Mosca risk value of the host enterprise application; and evaluating the risk of the host enterprise application for quantum cryptography migration, based on the cumulative risk value of the host enterprise application and an average cumulative risk value.

In an embodiment, the application related data of the host enterprise application is received from one or more of: (i) one or more answers received for a questionnaire related to the host enterprise application, (ii) a source code of the host enterprise application, and (iii) one or more log files of the host enterprise application.

In an embodiment, the one or more application risk input parameters comprise of an application type, a threat type, a user type and validity, a vulnerability, and a third-party library validity.

In an embodiment, the one or more platform risk input parameters comprise of a language cohesion index, a lower environment risk parameter, an input and output movement, a shelf-life parameter, and a hardware security module (HSM) migration policy.

In an embodiment, the one or more risk policy input parameters comprise of a policy related parameter, a legacy application transformation, and a post quantum cryptography (PQC) algorithm vulnerability.

In an embodiment, computing the hazard value for each of the one or more application risk input parameters, the one or more platform risk input parameters, and the one or more risk policy input parameters, based on the associated input parameter value, using the modified cox model, comprising: receiving a number of qubits of a quantum computer, and a number of qubits needed to break a predefined cryptographic scheme defined for the host enterprise application, of one or more predefined cryptographic schemes; determining a quantum hazard value, based on the number of qubits of the quantum computer and the number of qubits needed to break a predefined cryptographic scheme defined for the host enterprise application; determining a partial likelihood function value for each of the one or more application risk input parameters, the one or more platform risk input parameters, and the one or more risk policy input parameters, using the modified cox model, by estimating a probability of attack on the predefined cryptographic scheme for a current instance with respect to one or more historical instances that are vulnerable to computing capability of the quantum computer; and calculating the hazard value for each of the one or more application risk input parameters, the one or more platform risk input parameters, and the one or more risk policy input parameters values, using the quantum hazard value, an associated partial likelihood function value and the associated input parameter value.

In an embodiment, evaluating the risk the host enterprise application for quantum cryptography migration, based on the cumulative risk value of the host enterprise application and the average cumulative risk value, comprising:

(i) assigning the host enterprise application with a high priority and allowing a migration of the host enterprise application when the cumulative risk value of the host enterprise application is higher than the average cumulative risk value; and (ii) assigning the host enterprise application with a low priority and postponing the migration of the host enterprise application when the cumulative risk value of the host enterprise application is less than or equal to the average cumulative risk value.

In an embodiment, the Mosca risk value of the host enterprise application is determined using the rule of Mosca, according to a relation:

$$\text{Mosca risk value} = Z - (X + Y)$$

wherein Z is the time by which quantum computer manufactured with sufficient qubits, which breaks the predefined crypto scheme, X is the data shelf life of application related data of the host enterprise application, and Y is the time to migrate the host enterprise application.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
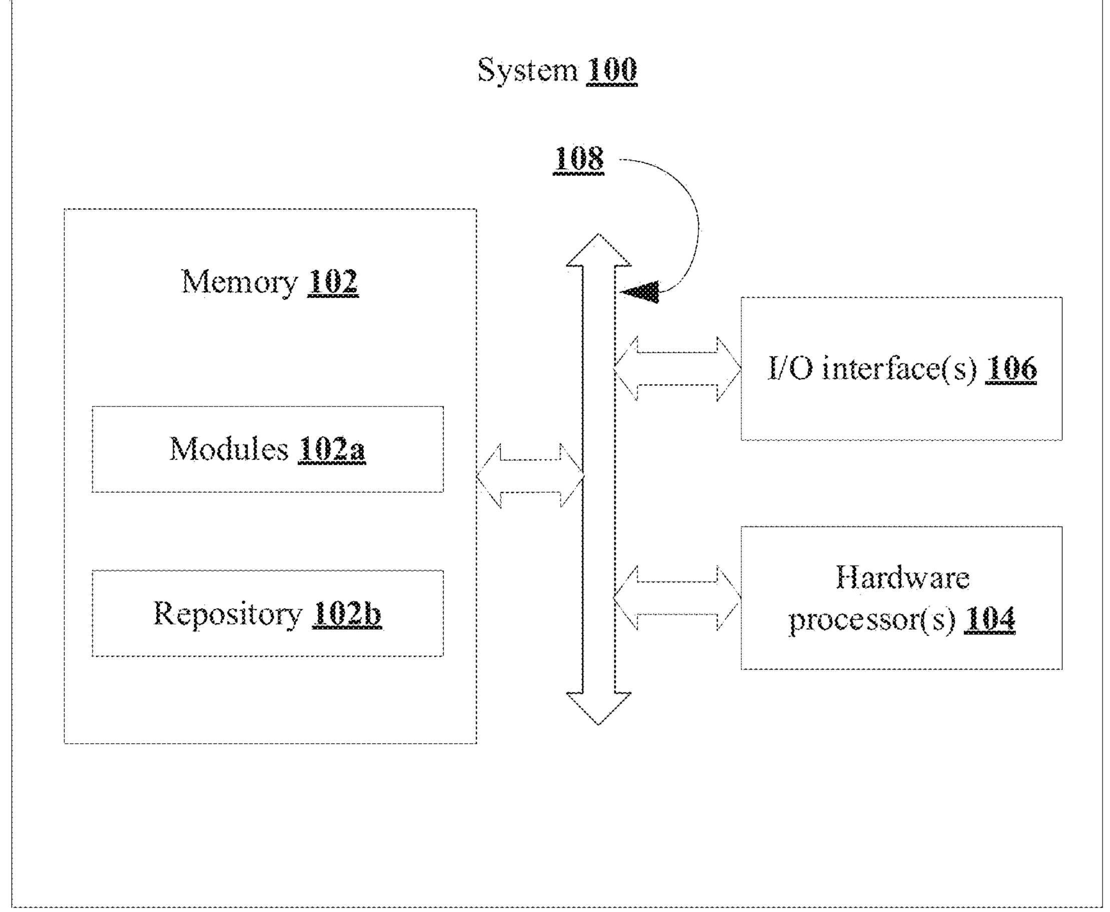
FIG. 1 is an exemplary block diagram of a system for estimating risk of enterprise application for quantum cryptography migration, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure solves the technical problems in the art for estimating risk of enterprise application for quantum cryptography migration. The methods and systems of the present disclosure formulated the problem based on a survival function in the probability theory, possible chances of application crypto surviving the quantum attacks are estimated, and an estimated risk value is assigned to the enterprise software application (hereafter referred as the enterprise application). The methods and systems of the present disclosure discloses a risk estimator which take enterprise application specific metadata as the inputs and produces the risk score associated to the enterprise application against the quantum threats using a modified cox model and a modified rule of Mosca (Mosca's rule).

Referring now to the drawings, and more particularly to FIG. 1 through FIG. 6, where similar reference characters denote corresponding features consistently throughout the figures, there are shown preferred embodiments and these embodiments are described in the context of the following exemplary systems and/or methods.

FIG. 1 is an exemplary block diagram of a system 100 for estimating risk of enterprise application for quantum cryptography migration, in accordance with some embodiments of the present disclosure. In an embodiment, the system 100 includes or is otherwise in communication with one or more hardware processors 104, communication interface device (s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules **102*a* and a repository 102*b* for storing data processed, received, and generated by one or more of the plurality of modules 102*a*. The plurality of modules 102*a*** may include routines, programs, objects, components, data structures, and so on, which perform particular tasks or implement particular abstract data types.

The plurality of modules **102*a* may include programs or computer-readable instructions or coded instructions that supplement applications or functions performed by the system 100. The plurality of modules 102*a* may also be used as, signal processor(s), state machine(s), logic circuitries, and/or any other device or component that manipulates signals based on operational instructions. Further, the plurality of modules 102*a* can be used by hardware, by computer-readable instructions executed by the one or more hardware processors 104, or by a combination thereof. In an embodiment, the plurality of modules 102*a* can include various sub-modules (not shown in FIG. 1). Further, the memory 102 may include information pertaining to input(s)/output(s) of each step performed by the processor(s) 104 of the system 100** and methods of the present disclosure.

The repository **102*b* may include a database or a data engine. Further, the repository 102*b* amongst other things, may serve as a database or includes a plurality of databases for storing the data that is processed, received, or generated as a result of the execution of the plurality of modules 102*a*. Although the repository 102*b* is shown internal to the system 100, it will be noted that, in alternate embodiments, the repository 102*b* can also be implemented external to the system 100, where the repository 102*b* may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102***b* may be distributed between the system 100 and the external database.

Figure 2:
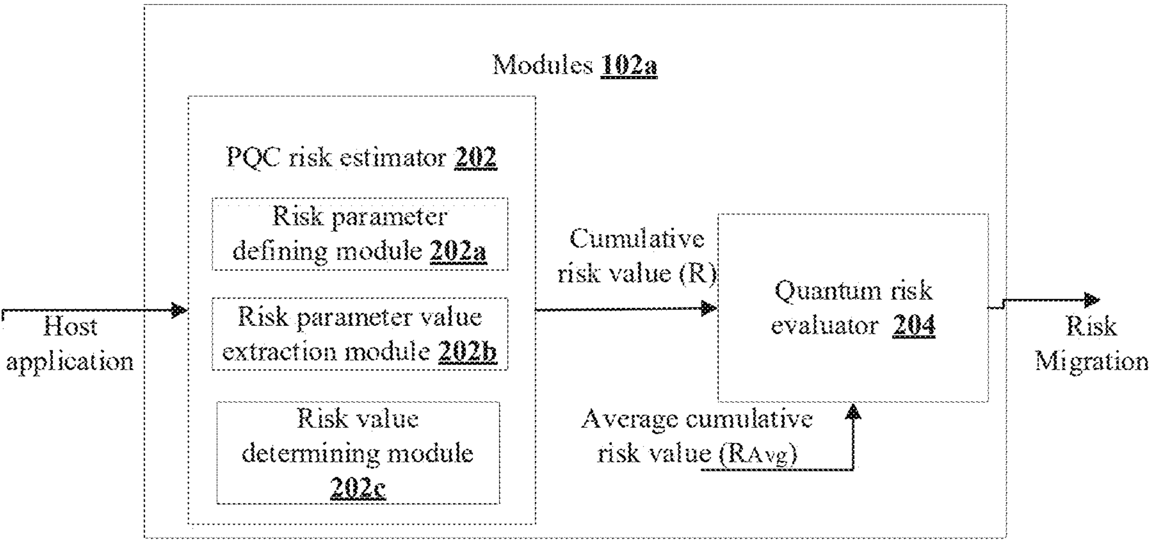
FIG. 2 is an exemplary block diagram illustrating a plurality of modules of the system of FIG. 1, for estimating risk of enterprise application for quantum cryptography migration, in accordance with some embodiments of the present disclosure.
Figure 3A:
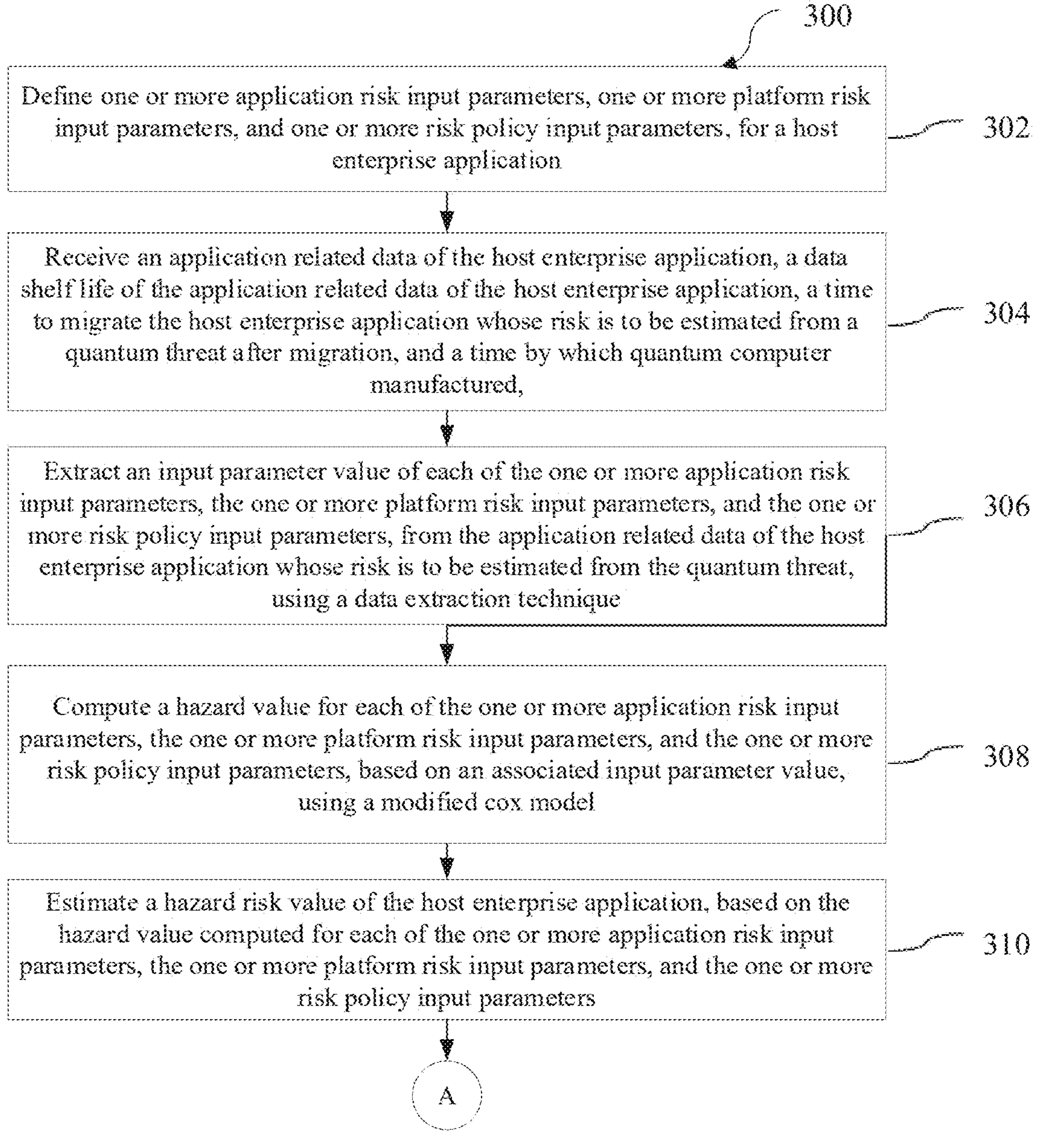
FIGS. 3A-3B illustrate exemplary flow diagrams of a processor-implemented method for estimating risk of enterprise application for quantum cryptography migration, using the system of FIG. 1, in accordance with some embodiments of the present disclosure.
Figure 3B:
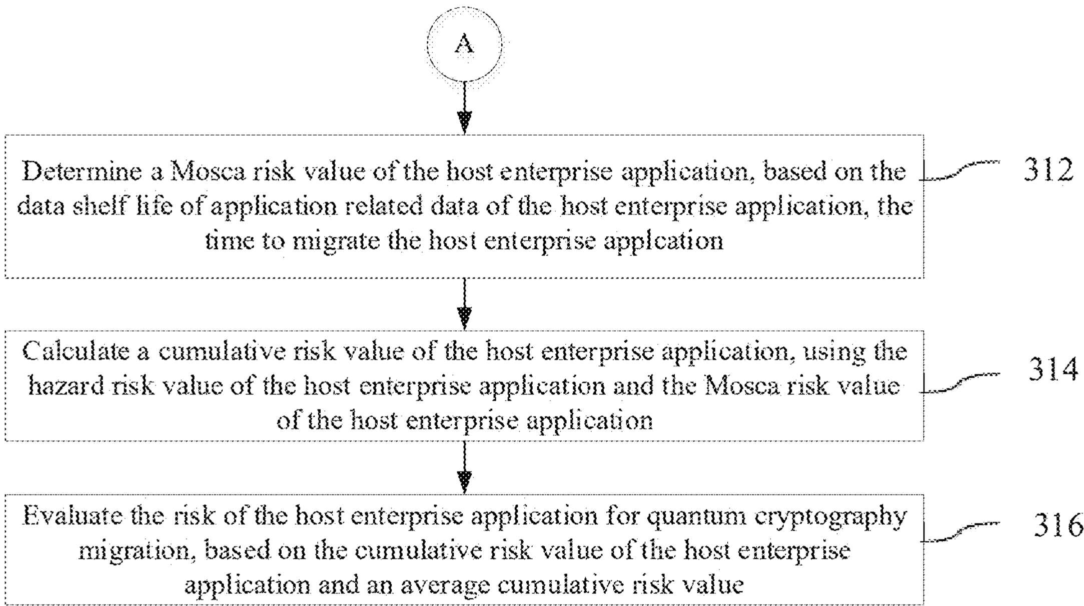

Referring collectively to FIG. 2 and FIGS. 3A-3B, components and functionalities of the system 100 are described in accordance with an example embodiment of the present disclosure. For example, FIG. 2 is an exemplary block diagram illustrating the plurality of modules 102*a* of the system 100 of FIG. 1, for estimating risk of enterprise application for quantum cryptography migration, in accordance with some embodiments of the present disclosure. In an embodiment, the plurality of modules 102*a* includes a post quantum cryptography (PQC) risk estimator 202 and a quantum risk evaluator 204. In an embodiment, the PQC risk estimator 202 further includes a risk parameter defining module 202*a*, a risk parameter value extraction module 202*b*, and a risk value determining module 202*c*. In an embodiment, the plurality of modules 102*a* are collectively referred as a quantum cryptography software risk assessment tool (not shown in FIG. 2) for estimating risk of enterprise application for quantum cryptography migration.

For example, FIGS. 3A-3B illustrate exemplary flow diagrams of a processor-implemented method 300 for estimating risk of enterprise application for quantum cryptography migration, using the system 100 of FIG. 1, in accordance with some embodiments of the present disclosure. Although steps of the method 300 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

Figure 4:
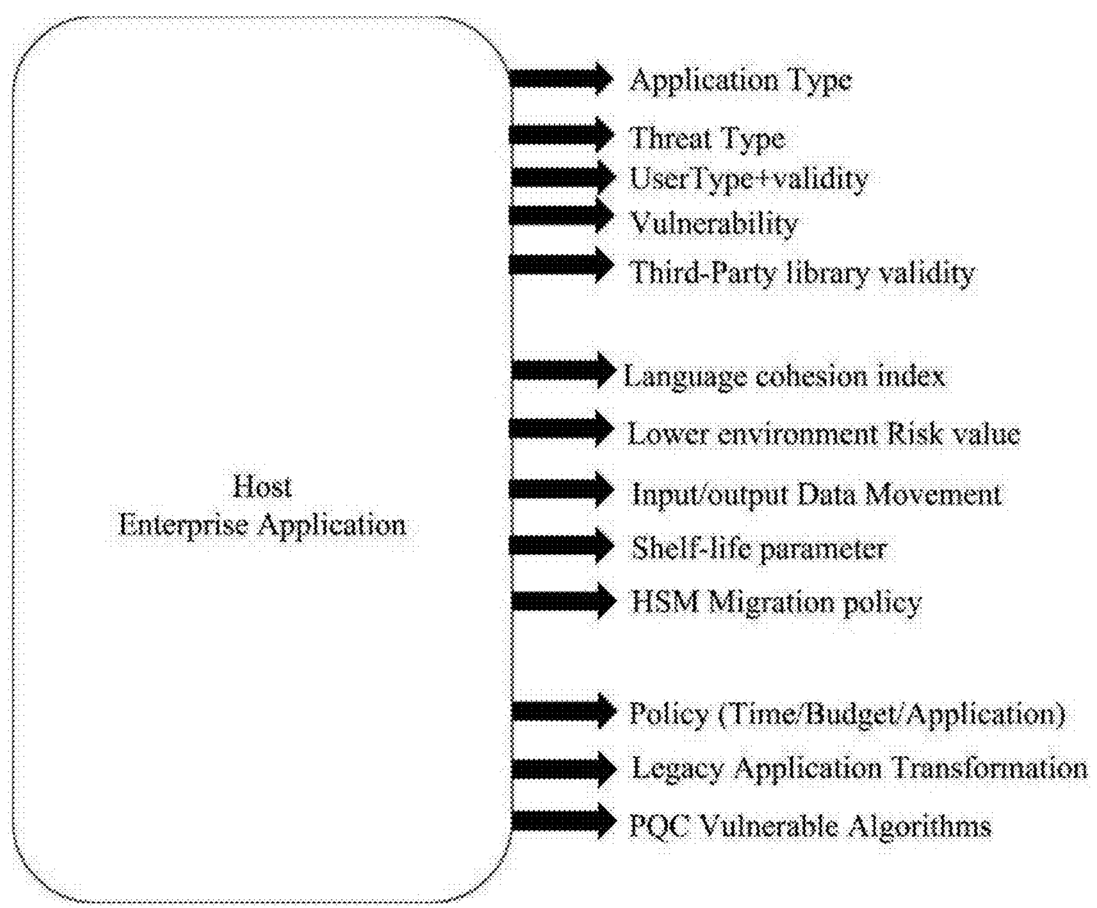
FIG. 4 is an exemplary block diagram illustrating various input parameters, for estimating risk of the host enterprise application for quantum cryptography migration, in accordance with some embodiments of the present disclosure.

At step 302 of the method 300, the one or more hardware processors 104 of the system 100 are configured to define various input parameters for estimating risk of a host enterprise application for quantum cryptography migration. In an embodiment, the risk parameter defining module 202*a* of the PQC risk estimator 202 is configured to define various input parameters. FIG. 4 is an exemplary block diagram illustrating various input parameters, for estimating risk of the host enterprise application for quantum cryptography migration, in accordance with some embodiments of the present disclosure. As shown in FIG. 4, various input parameters incudes one or more application risk input parameters, one or more platform risk input parameters, and one or more risk policy input parameters, for a given host enterprise application. The one or more application risk input parameters, the one or more platform risk input parameters, and the one or more risk policy input parameters are defined for the given host enterprise application for which the quantum risks to be estimated.

In an embodiment, the one or more application risk input parameters include but are not limited to an application type, a threat type, a user type and validity, a vulnerability, and a third-party library validity.

In an embodiment, the application type defines the type of the host enterprise application for which the quantum risks to be estimated. In an embodiment, the application type is one of application type from a list including but are not limited to a web application, a stand-alone application, a graphical user interface (GUI) based application or a combination thereof. This is required because the web applications are subjected to attacks as they have high exposure than other application type.

The threat type defines the threat levels the given host enterprise application is likely to face based on the application type. In an embodiment, the threat type is one of the threat levels including a high level, a medium level, and a low level. In an embodiment, the user type and validity define the kind of one or more users who access the given host enterprise application after the migration. In an embodiment, the user type and validity are one of the user type and validity levels measured in terms of benign users and malicious users.

In an embodiment, the vulnerability defines the number of operations/statements present in the given host enterprise application, that are prone to quantum attacks. In an embodiment, the third-party library validity defines the presence or absence of the one or more third-party libraries in the given host enterprise application, to defend against the attacks related to quantum computer. In an embodiment, the third-party library validity is either yes or no based on the presence or absence of the one or more third-party libraries in the given host enterprise application.

In an embodiment, the one or more platform risk input parameters include, but are not limited to a language cohesion index, a lower environment risk parameter, an input and output movement, a shelf-life parameter, and a hardware security module (HSM) migration policy.

In an embodiment, the language cohesion index defines the number of the programming languages used in the given host enterprise application. Diversity of languages or interfacing between two modules written in different programming languages always can be a challenge in number of ways. In an embodiment, the lower environment risk parameter defines the number of environment levels are present in the given host enterprise application. In an embodiment, the number of environment levels includes but are not limited to a test environment, a staging environment, etc., under the production level, a pre-production level, a system level, and scripts and background processes.

In an embodiment, the input and output movement define an amount of encrypted data is moving into or outside of the organization as the result of execution of the given host enterprise application. The input and output movement are measured in terms of a value in DB. In an embodiment, the shelf-life parameter defines the shelf-life value of the existing encrypted data in the organization. In an embodiment, the shelf-life parameter is measured in terms of a number of years of the existing encrypted data in the organization. In an embodiment, the hardware security model (HSM) migration policy defines the presence (yes) or absence (No) of the hardware security models (HSM) such as secure vaults used in the given host enterprise application. This also defines how the original equipment manufacturer (OEM) of these services have any roadmap for the post quantum cryptography.

In an embodiment, the one or more risk policy input parameters include but are not limited to a policy related parameter, a legacy application transformation, and a post quantum cryptography (PQC) algorithm vulnerability.

In an embodiment, the policy related parameter defines the presence (Yes) or the absence (No) of the policy for PQC migration with inputs from the clients such as time, budget, and complexity of the given host enterprise application. In an embodiment, the legacy application transformation defines the presence (Yes) or the absence (No) of the legacy applications in the given host enterprise application and how can they be transformed to the PQC. In an embodiment, the post quantum cryptography (PQC) algorithm vulnerability defines a possibility of risk (Yes/No) of the PQC algorithms declared vulnerable by a competing authority such as the National Institute of Standards and Technology (NIST). The post quantum cryptography (PQC) algorithm vulnerability also defines the impact of this vulnerability during the current migration.

At step 304 of the method 300, the one or more hardware processors 104 of the system 100 are configured to receive an application related data of the given host enterprise application whose risk is to be estimated from a quantum threat after migration. Apart from the application related data, a data shelf life of the application related data of the host enterprise application, a time to migrate the host enterprise application, and a time by which the quantum computer manufactured, are also received.

In an embodiment, the application related data is the metadata of the host enterprise application and is received in several ways. In an embodiment, the application related data is received from: (i) one or more answers received for a questionnaire related to the host enterprise application, (ii) a source code of the host enterprise application, (iii) one or more log files of the host enterprise application, (iv) and a combination thereof.

At step 306 of the method 300, the one or more hardware processors 104 of the system 100 are configured to extract an input parameter value of each of the one or more application risk input parameters, the one or more platform risk input parameters, and the one or more risk policy input parameters received at step 302 of the method 300, from the application related data of the host enterprise application received at step 304 of the method 300. In an embodiment, the risk parameter value extraction module 202*b* of the PQC risk estimator 202 is configured to extract the input parameter value of each of the one or more application risk input parameters, the one or more platform risk input parameters, and the one or more risk policy input parameters.

In an embodiment, a data extraction technique such as a code parsing technique, a natural language processing (NLP) based text matching technique, a machine learning (ML) based data classification technique, or an Artificial Intelligence (AI) based data classification technique is used to extract the input parameter value of each of the one or more application risk input parameters, the one or more platform risk input parameters, and the one or more risk policy input parameters.

In an embodiment, the threat level type (high level, medium level and a low level) is extracted using online security forums and encode it in form of rules to assign different threat level types using web crawlers. For example, the web application security threats are maintained by the Open Worldwide Application Security Project (OWASP). Similarly, executable (exe) application has its own set of threats associated with it and the web crawler that extracts information from popular sites can be used to extract the threat level type of the given host enterprise application.

In an embodiment, code parser can fetch the input parameter value of the user type and validity by analyzing the user access policy related data. In an embodiment, the input parameter value of the vulnerability can be extracted from the audit report, or the vulnerabilities related to the application may be present and reported during the testing phase. In an embodiment, the input parameter value of the third-party library validity can be fetched using the code parsers from the dependency of the third-party libraries present in the given host enterprise application.

In an embodiment, the code parser can check the extension of binary files and through further processing of the libraries by a reverse engineering framework, can safely estimate the programming languages to extract the input parameter value of the language cohesion index. In an embodiment, the code parser can get the input parameter value of the lower environment risk parameter. It is assumed that less the number of such environments the more risk it will carry when an application goes live in the production due to less rigorous testing.

In an embodiment, a module that has permissions to query all databases can map the output of queries to the web applications which are allowed to be scanned by code parser to come up with a lower bound to extract the input parameter value of the input and output movement (in DB). Further, probes through the log files can reveal some value of the input and output movement. In an embodiment, the input parameter value of the shelf-life parameter is related to how long the data records like employee record and health record is stored in the database. The code parser can have a semantic matching module that can determine the attribute name in an application database. Based on this information, one can determine the type of data. For example, whether it is an attribute of a medical record, an attribute of insurance policy, etc. For each such attribute, there will be an indicative life of that attribute which can be modified by SME if required.

It is important that the hardware security module (HSM) migration policy used in the given host enterprise application is PQC safe. In an embodiment, the code parser can figure out some values through inventory process. Web crawlers can be used to fetch this data from company sites.

Management related initiative is very important as they are key approving authorities for initiatives in order to arrive at the policy related parameters. In an embodiment, the input parameter value of the policy related parameter is obtained from questionnaire or from web crawlers on the company related websites. Legacy applications are based on languages that are not having PQC libraries in that perspective migration will be tough. In an embodiment, the input parameter value of the legacy application transformation can be fetched from the questionnaire.

The PQC algorithm or libraries may be vulnerable to some threat or inherent bug. In an embodiment, the web crawlers are used to fetch the input parameter value of the post quantum cryptography (PQC) algorithm vulnerability from the websites of the PQC library and industry standard bodies.

At step 308 of the method 300, the one or more hardware processors 104 of the system 100 are configured to compute a hazard value for each of the one or more application risk input parameters, the one or more platform risk input parameters, and the one or more risk policy input parameters, defined at step 302 of the method 300. In an embodiment, a modified cox model is used to compute the hazard value based on the associated input parameter value extracted at step 306 of the method 300.

The present disclosure is based on the survival function where the survival curve S(t) shows the survival as a function of time t. Here, S(t) is called the survival function also known as the survivor function or just the survival curve. Formally, S(t) is the probability that the random variable T is larger than a specified time t, i.e., $$S(t) = Pr(T > t) \tag{1}$$

Since S(t) is defined for a group of subjects, it can be interpreted as the proportion of subjects having survived until time t.

For example, in a cancer study, each individual age when they got cancer (the event time T) and the individual gender, body mass index (BMI), smoking habit and education level are considered are the covariables or covariates. Health scientists are often interested in how these covariates change the survival function. Let X denotes the covariates. A parameter of interest will be the survival function of T given X. Namely, the conditional survival function can be expressed as in equation 2:

$$S(t/x) = Pr(T > t/X = x) \tag{2}$$

The death intensity is the hazard function that shows the fold-risk estimate of dying compared with the reference person. The hazard function focuses on failing, the survival function focuses on surviving. The hazard function can be expressed as in equation 3:

$$h(t) = \lim_{\nabla t \to 0} \frac{P(t < T1 \le t + \nabla t \mid T1 > t)}{\nabla t} \tag{3}$$

The Cox (proportional hazard) model is one of the most popular models combining the covariates and the survival function, using the hazard value of each input parameter, the risk value of the host enterprise application is calculated subjected to incase of the quantum computer arrives with the computing power of certain number of bits. It starts with modelling the hazard function for p covariates which are the values derived as parameter values. The formula of the standard Cox (proportional hazard) model is represented as in equation 4:

$$h(t/X = x) = h_0(t)\exp(x^T\beta) \tag{4}$$

The standard Cox (proportional hazard) model is enhanced (modified) by including quantum hazard $h_{quant}(\ )$ as initial baseline hazard value $h_0(\ )$. This represents the partial likelihood of the current quantum computer breaking the crypto system and it is represented by the ratio of number of qubits ($n_{qubits}$) of the currently a stable quantum computer has to the number of qubits needed ($n_{qubit\text{-}crpto\ system}$) to break the given cryptographic scheme. Hence the equation 4 can be remodified as equation 5:

$$h(t/X = x) = h_{quant}(t)\exp(x^T\beta) \tag{5}$$

$$\text{wherein } h_{quant}(t) = \frac{n_{qubits}(t)}{n_{qubit-crpto\ system(t)}} \tag{6}$$

$$h(t, X) = h_{quant}(t)\exp\sum_i^p \beta_i X_i \tag{7}$$

wherein X is the vector of coefficients of each covariate or the input parameter defined at step 302 of the method 300. The estimation of the parameter β is often done by maximizing the partial likelihood function by estimating the probability the current instances is subjected to attack on its cryptographic scheme by current quantum computer with respect to $\text{History}_i=\{r_1, r_2, \ldots, r_i \ldots, r_m\}$ history/previous values that ae vulnerable to computing capability of quantum computer:

$$L(\beta) = \prod_{i=1}^m p(r_i/\text{History}_i) \tag{8}$$

Figure 5:
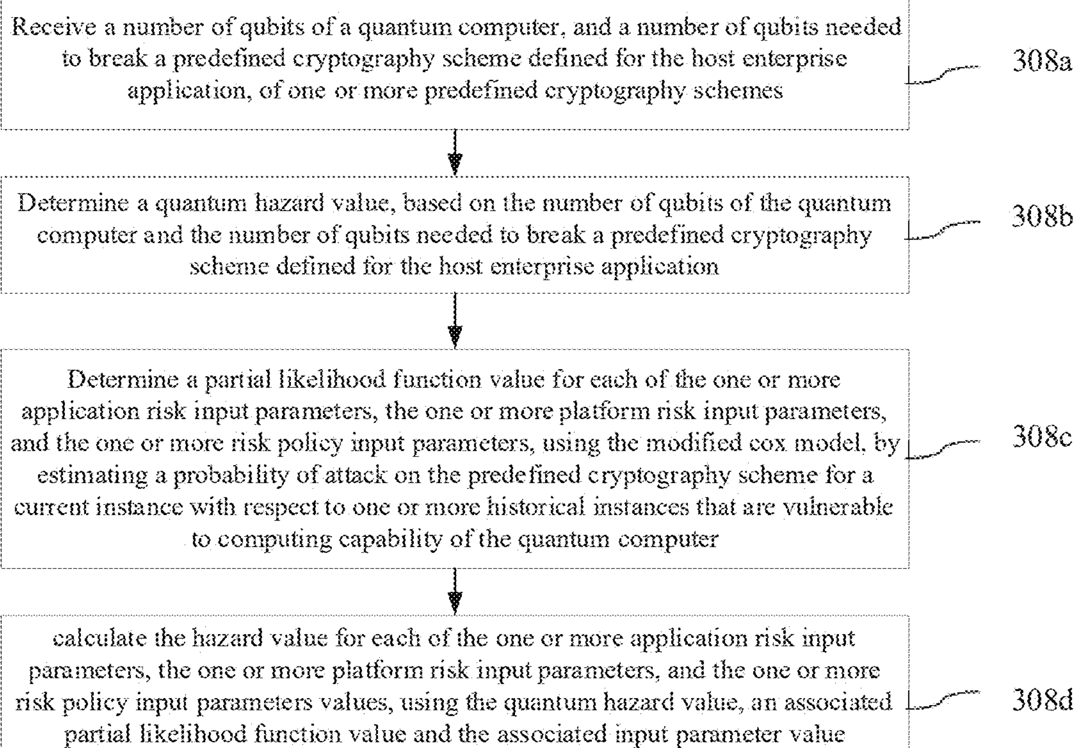
FIG. 5 illustrate an exemplary flow diagram for computing the hazard value for each of the one or more application risk input parameters, the one or more platform risk input parameters, and the one or more risk policy input parameters, based on the associated input parameter value, using the modified cox model, in accordance with some embodiments of the present disclosure.

FIG. 5 illustrate an exemplary flow diagram for computing the hazard value for each of the one or more application risk input parameters, the one or more platform risk input parameters, and the one or more risk policy input parameters, based on the associated input parameter value, using the modified cox model, in accordance with some embodiments of the present disclosure. As shown in FIG. 5, computing the hazard value for each of the one or more application risk input parameters, the one or more platform risk input parameters, and the one or more risk policy input parameters, based on the associated input parameter value, using the modified cox model, is explained through steps 308*a* through 308*d*.

At step 308*a*, a number of qubits of the quantum computer ($n_{qubits}$ (t)), and a number of qubits needed to break a predefined cryptographic scheme ($n_{qubit\text{-}crpto\ system(t)}$) defined for the host enterprise application, are received. The number of qubits of the quantum computer refers to the number of qubits of the quantum computer available in the present market along with its other technical properties. The predefined cryptographic scheme is the cryptographic scheme used in the given host enterprise application whose risk is to be estimated from the quantum threat. In an embodiment, the predefined cryptographic scheme is selected from one or more predefined cryptographic schemes including but are not limited to Rivest Shamir Adleman (RSA) scheme, Elliptic Curve Digital Signature Algorithm, Digital Signature Algorithm, and Diffie Hellman Key Agreement protocol.

At step 308*b*, a quantum hazard value is determined based on the number of qubits of the quantum computer ($n_{qubits}$ (t)) and the number of qubits needed to break a predefined cryptographic scheme ($n_{qubit\text{-}crpto\ system(t)}$) defined for the host enterprise application, that are received at step 308*a*, using equation 6. Note here that the quantum hazard value is constant and static and will change when there is change either in the number of qubits of the quantum computer available in the present market or the change in the number of qubits needed to break the predefined cryptographic scheme.

Table 1 shows the exemplary information about some of cryptographic schemes and the number of qubits required to break the given crypto scheme.

TABLE 1

| Cryptographic Scheme | Key Size | Qubits needed to break |
|---|---|---|
| SHA | 256 | 2 million |
| AES | 128 | 4 million |
| | 192 | 8.05 million |
| | 256 | 8.56 million |
| RSA | 2048 | 16 million |
| | 4096 | 33 million |

At step 308*c*, a partial likelihood function value (β) for each of the one or more application risk input parameters, the one or more platform risk input parameters, and the one or more risk policy input parameters received at step 302 of the method 300, is determined using equation 8 of the modified cox model. The partial likelihood function is an adaption of the full likelihood such that only a part of the parameters (the parameters of interest) occurs in it. The partial likelihood function value (β) for each input parameter is determined by estimating a probability of attack on the predefined cryptographic scheme for a current instance with respect to one or more historical instances that are vulnerable to computing capability of the quantum computer.

At step 308*d*, the hazard value for each of the one or more application risk input parameters, the one or more platform risk input parameters, and the one or more risk policy input parameters values, is calculated, using equation 7 of the modified cox model, and using the quantum hazard value ($h_{quant}(t)$) determined at step 308*b*, the associated partial likelihood function value (β) determined at step 308*c*, and the associated input parameter value (X) extracted at step 306 of the method 300.

At step 310 of the method 300, the one or more hardware processors 104 of the system 100 are configured to estimate a hazard risk value (H) of the host enterprise application. In an embodiment, the hazard risk value of the host enterprise application is calculated by adding the hazard value computed for each of the one or more application risk input parameters, the one or more platform risk input parameters, and the one or more risk policy input parameters computed at step 308 of the method 300, as represented in equation 9:

$$H = \sum_{i=1}^{n} H_i \tag{9}$$

At step 312 of the method 300, the one or more hardware processors 104 of the system 100 are configured to determine a Mosca risk value of the host enterprise application whose risk is to be estimated from the quantum threat. In an embodiment, the Mosca risk value of the host enterprise application is determined based on the data shelf life of application related data of the host enterprise application received at step 304 of the method 300, the time to migrate the host enterprise application received at step 304 of the method 300, and the time by which quantum computer manufactured received at step 304 of the method. Further a modified rule of Mosca (modified Mosca's rule) is used to determine the Mosca risk value of the given host enterprise application.

In an embodiment, the Mosca risk value of the host enterprise application is determined using the modified rule of Mosca, according to a relation:

$$\text{Mosca risk value} = Z - (X + Y) \tag{10}$$

wherein Z is the time by which quantum computer manufactured with sufficient qubits, which breaks the predefined crypto scheme, X is the data shelf life of application related data of the host enterprise application, and Y is the time to migrate the host enterprise application. If Z is greater than zero, then the given host enterprise application is at a risk of the quantum attacks threats.

At step 314 of the method 300, the one or more hardware processors 104 of the system 100 are configured to calculate a cumulative risk value of the host enterprise application ($R_{Cumulative}$), using the hazard risk value of the host enterprise application estimated at step 310 of the method 300, and the Mosca risk value of the host enterprise application determined at step 312 of the method 300. More specifically, the cumulative risk value of the host enterprise application ($R_{Cumulative}$), is calculated by adding the hazard risk value of the host enterprise application estimated at step 310 of the method 300, and the Mosca risk value of the host enterprise application determined at step 312 of the method 300. In an embodiment, the risk value determining module 202*c* of the PQC risk estimator 202 is configured to calculate the cumulative risk value of the host enterprise application ($R_{Cumulative}$).

At step 316 of the method 300, the one or more hardware processors 104 of the system 100 are configured to evaluate the risk the given host enterprise application for quantum cryptography migration, based on the cumulative risk value of the host enterprise application ($R_{Cumulative}$) calculated at step 314 of the method 300 and an average risk value ($R_{Avg\text{-}Cumulative}$). In an embodiment, the quantum risk evaluator 204 is configured to evaluate the risk the given host enterprise application for quantum cryptography migration, based on the cumulative risk value of the host enterprise application ($R_{Cumulative}$), and the average cumulative risk value ($R_{Cumulative}$). In an embodiment, the average cumulative risk value ($R_{Cumulative}$) is obtained by taking the average of the cumulative risk values of multiple host enterprise application of the organization.

In this step, evaluating the risk the host enterprise application for quantum cryptography migration, based on the cumulative risk value of the host enterprise application ($R_{Cumulative}$), and the average cumulative risk value ($R_{Avg\text{-}Cumulative}$), is based on two scenarios or cases, namely the first scenario and the second scenario.

In the first scenario, when the cumulative risk value of the host enterprise application ($R_{Cumulative}$) is higher than the average cumulative risk value ($R_{Avg\text{-}Cumulative}$), then the host enterprise application is assigned with a high priority and allowing the given host enterprise application towards migration. In other words, when the cumulative risk value of the host enterprise application ($R_{Cumulative}$) is higher than the average cumulative risk value ($R_{Avg\text{-}Cumulative}$), then the corresponding host enterprise application is free from risks of the quantum threats after the migration.

In the second scenario, when the cumulative risk value ($R_{Cumulative}$) of the host enterprise application is less than or equal to the average cumulative risk value ($R_{Avg\text{-}Cumulative}$), then the host enterprise application is assigned with a low priority and postponing the migration of the given host enterprise application. In other words, when the cumulative risk value of the host enterprise application ($R_{Cumulative}$) is less than or equal to the average cumulative risk value ($R_{Avg\text{-}Cumulative}$), then the corresponding host enterprise application may be at risk from the quantum threats after the migration. In this way, the methods and systems of the present disclosure estimates the risk of the host enterprise applications for quantum cryptography migration.

Hence the methods and systems of the present disclosure estimate the risk of the enterprise applications for quantum cryptography migration using the modified Cox model and the modified rule of Mosca. The various input parameters defined at step 302 of the method 300 for the host enterprise application, allow to estimate the hazard risk of each input parameter, thus the cumulative risk value of the host enterprise application is accurate for estimating the risk of the enterprise applications for quantum cryptography migration. As both the modified Cox model and the modified rule of Mosca are considered, the methods and systems of the present disclosure estimate the risk of the enterprise applications for quantum cryptography migration is efficient and effective.

Example Scenario:

In the experiments, the risk assessment from quantum threats is performed for 57 Java based enterprise applications. The input parameter value of the covariates pertaining to cryptographic schemes of the enterprise applications is extracted from the code parser and the input parameter value of the other covariates are taken from the answers of the questionnaire received from the application admins. It is considered that in another 10 years, a full-fledged quantum computer is considered. Based on the above data, the risk assessment has been performed.

Figure 6:
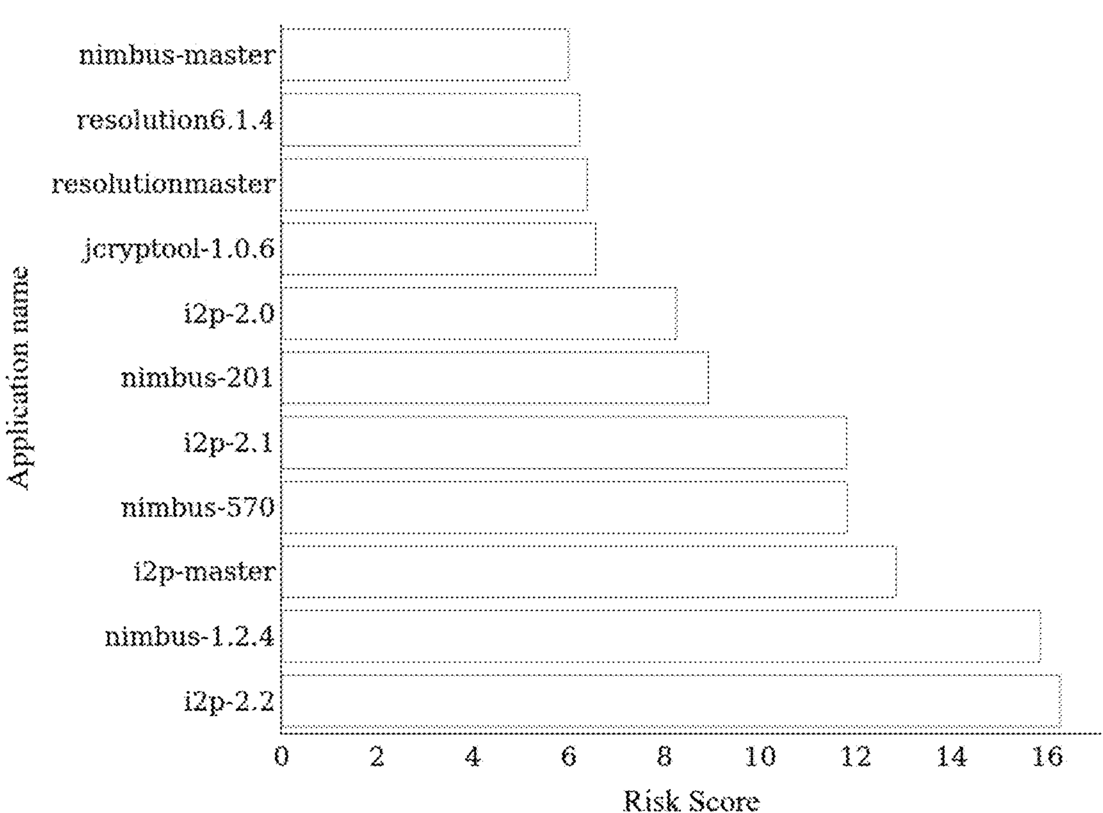
FIG. 6 is a graph showing exemplary cumulative risk values of some enterprise applications, in accordance with some embodiments of the present disclosure.

FIG. 6 is a graph showing exemplary cumulative risk values of some enterprise applications, in accordance with some embodiments of the present disclosure. As shown in FIG. 6, about 11 enterprise applications are presented in Y-Axis and the corresponding cumulative risk score is provided in the X-Axis. Based on the results it was observed that all the enterprise applications which are having the cryptographic operations having low security level and that can be broken early are reported with high risk and need immediate migration.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of the estimating the risk of the enterprise applications from quantum threats, average cumulative risk value using the modified Cox model and the modified rule of Mosca. Hence the methods and systems of the present disclosure assess the risk of the enterprise applications against the given cryptographic scheme. As both the modified Cox model and the modified rule of Mosca are considered, the methods and systems of the present disclosure estimate the risk of the enterprise applications for quantum cryptography migration is efficient and effective.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising the steps of:

defining, via one or more hardware processors, one or more application risk input parameters, one or more platform risk input parameters, and one or more risk policy input parameters, for a host enterprise application;

receiving, via the one or more hardware processors, an application related data of the host enterprise application, a data shelf life of the application related data of the host enterprise application, a time to migrate the host enterprise application whose risk is to be estimated from a quantum threat after migration, and a time by which a quantum computer manufactured;

extracting, via the one or more hardware processors, an input parameter value of each of the one or more application risk input parameters, the one or more platform risk input parameters, and the one or more risk policy input parameters, from the application related data of the host enterprise application whose risk is to be estimated from the quantum threat, using a data extraction technique, wherein a code parser is configured to fetch the input parameter value of an user type and a validity by analyzing an user access policy related data, and wherein the input parameter value corresponding to a vulnerability is extracted from an audit report or from vulnerability information generated during an application testing phase, and wherein the input parameter value associated with validity of a third party library is fetched based on dependency information of one or more third party libraries present in the host enterprise application;

computing, via the one or more hardware processors, a hazard value for each of the one or more application risk input parameters, the one or more platform risk input parameters, and the one or more risk policy input parameters, based on an associated input parameter value, using a modified cox model, wherein computing the hazard value for each of the one or more application risk input parameters, the one or more platform risk input parameters, and the one or more risk policy input parameters, based on the associated input parameter value, using the modified cox model, comprising:

receiving a number of qubits of a quantum computer, and a number of qubits needed to break a predefined cryptographic scheme defined for the host enterprise application, of one or more predefined cryptographic schemes;

determining a quantum hazard value, based on the number of qubits of the quantum computer and the number of qubits needed to break a predefined cryptographic scheme defined for the host enterprise application;

determining a partial likelihood function value for each of the one or more application risk input parameters, the one or more platform risk input parameters, and the one or more risk policy input parameters, using the modified cox model, by estimating a probability of attack on the predefined cryptographic scheme for a current instance with respect to one or more historical instances that are vulnerable to computing capability of the quantum computer; and calculating the hazard value for each of the one or more application risk input parameters, the one or more platform risk input parameters, and the one or more risk policy input parameters values, using the quantum hazard value, an associated partial likelihood function value and the associated input parameter value;

estimating, via the one or more hardware processors, a hazard risk value of the host enterprise application, based on the hazard value computed for each of the one or more application risk input parameters, the one or more platform risk input parameters, and the one or more risk policy input parameters;

determining, via the one or more hardware processors, a Mosca risk value of the host enterprise application, based on the data shelf life of application related data of the host enterprise application, the time to migrate the host enterprise application, and the time by which quantum computer manufactured, using a rule of Mosca;

calculating, via the one or more hardware processors, a cumulative risk value of the host enterprise application, using the hazard risk value of the host enterprise application and the Mosca risk value of the host enterprise application;

evaluating, via the one or more hardware processors, the risk of the host enterprise application for quantum cryptography migration, based on the cumulative risk value of the host enterprise application and an average cumulative risk value, wherein evaluating the risk the host enterprise application for quantum cryptography migration, based on the cumulative risk value of the host enterprise application and the average cumulative risk value, comprising:

(i) assigning the host enterprise application with a high priority and allowing a migration of the host enterprise application when the cumulative risk value of the host enterprise application is higher than the average cumulative risk value; and (ii) assigning the host enterprise application with a low priority and postponing the migration of the host enterprise application when the cumulative risk value of the host enterprise application is less than or equal to the average cumulative risk value; and performing, via the one or more hardware processors, the quantum cryptography migration based on the evaluated risk of the host enterprise application.

2. The processor-implemented method of claim 1, wherein the application related data of the host enterprise application is received from one or more of: (i) one or more answers received for a questionnaire related to the host enterprise application, (ii) a source code of the host enterprise application, and (iii) one or more log files of the host enterprise application.

3. The processor-implemented method of claim 1, wherein the one or more application risk input parameters comprise of an application type, a threat type, a user type and validity, a vulnerability, and a third-party library validity.

4. The processor-implemented method of claim 1, wherein the one or more platform risk input parameters comprise of a language cohesion index, a lower environment risk parameter, an input and output movement, a shelf-life parameter, and a hardware security module (HSM) migration policy.

5. The processor-implemented method of claim 1, wherein the one or more risk policy input parameters comprise of a policy related parameter, a legacy application transformation, and a post quantum cryptography (PQC) algorithm vulnerability, wherein the PQC algorithm vulnerability parameters represent a risk condition and an associated impact on the migration, the risk condition being based on vulnerability information associated with at least one PQC algorithm as identified by a recognized standards or analysis authority.

6. The processor-implemented method of claim 1, wherein the Mosca risk value of the host enterprise application is determined using the rule of Mosca, according to a relation:

$$Moscariskvalue = Z - (X + Y)$$

wherein Z is the time by which quantum computer manufactured with sufficient qubits, which breaks the predefined crypto scheme, X is the data shelf life of application related data of the host enterprise application, and Y is the time to migrate the host enterprise application.

7. A system, comprising:

a memory storing instructions;

one or more input/output (I/O) interfaces; and one or more hardware processors coupled to the memory via the one or more I/O interfaces, wherein the one or more hardware processors are configured by the instructions to:

define one or more application risk input parameters, one or more platform risk input parameters, and one or more risk policy input parameters, for a host enterprise application;

receive an application related data of the host enterprise application, a data shelf life of the application related data of the host enterprise application, a time to migrate the host enterprise application whose risk is to be estimated from a quantum threat after migration, and a time by which quantum computer manufactured;

extract an input parameter value of each of the one or more application risk input parameters, the one or more platform risk input parameters, and the one or more risk policy input parameters, from the application related data of the host enterprise application whose risk is to be estimated from the quantum threat, using a data extraction technique, wherein a code parser is configured to fetch the input parameter value of an user type and a validity by analyzing an user access policy related data, and wherein the input parameter value corresponding to a vulnerability is extracted from an audit report or from vulnerability information generated during an application testing phase, and wherein the input parameter value associated with validity of a third party library is fetched based on dependency information of one or more third party libraries present in the host enterprise application;

compute a hazard value for each of the one or more application risk input parameters, the one or more platform risk input parameters, and the one or more risk policy input parameters, based on an associated input parameter value, using a modified cox model, wherein computing the hazard value for each of the one or more application risk input parameters, the one or more platform risk input parameters, and the one or more risk policy input parameters, based on the associated input parameter value, using the modified cox model, comprising:

receiving a number of qubits of a quantum computer, and a number of qubits needed to break a predefined cryptographic scheme defined for the host enterprise application, of one or more predefined cryptographic schemes;

determining a quantum hazard value, based on the number of qubits of the quantum computer and the number of qubits needed to break a predefined cryptographic scheme defined for the host enterprise application;

determining a partial likelihood function value for each of the one or more application risk input parameters, the one or more platform risk input parameters, and the one or more risk policy input parameters, using the modified cox model, by estimating a probability of attack on the predefined cryptographic scheme for a current instance with respect to one or more historical instances that are vulnerable to computing capability of the quantum computer; and calculating the hazard value for each of the one or more application risk input parameters, the one or more platform risk input parameters, and the one or more risk policy input parameters values, using the quantum hazard value, an associated partial likelihood function value and the associated input parameter value;

estimate a hazard risk value of the host enterprise application, based on the hazard value computed for each of the one or more application risk input parameters, the one or more platform risk input parameters, and the one or more risk policy input parameters;

determine a Mosca risk value of the host enterprise application, based on the data shelf life of application related data of the host enterprise application, the time to migrate the host enterprise application, and the time by which quantum computer manufactured, using a rule of Mosca;

calculate a cumulative risk value of the host enterprise application, using the hazard risk value of the host enterprise application and the Mosca risk value of the host enterprise application;

evaluate the risk of the host enterprise application for quantum cryptography migration, based on the cumulative risk value of the host enterprise application and an average cumulative risk value, wherein evaluating the risk the host enterprise application for quantum cryptography migration, based on the cumulative risk value of the host enterprise application and the average cumulative risk value, comprising:

(i) assigning the host enterprise application with a high priority and allowing a migration of the host enterprise application when the cumulative risk value of the host enterprise application is higher than the average cumulative risk value; and (ii) assigning the host enterprise application with a low priority and postponing the migration of the host enterprise application when the cumulative risk value of the host enterprise application is less than or equal to the average cumulative risk value; and perform the quantum cryptography migration based on the evaluated risk of the host enterprise application.

8. The system of claim 7, wherein the one or more hardware processors are configured to receive the application related data of the host enterprise application from one or more of: (i) one or more answers received for a questionnaire related to the host enterprise application, (ii) a source code of the host enterprise application, and (iii) one or more log files of the host enterprise application.

9. The system of claim 7, wherein the one or more application risk input parameters comprise of an application type, a threat type, a user type and validity, a vulnerability, and a third-party library validity.

10. The system of claim 7, wherein the one or more platform risk input parameters comprise of a language cohesion index, a lower environment risk parameter, an input and output movement, a shelf-life parameter, and a hardware security module (HSM) migration policy.

11. The system of claim 7, wherein the one or more risk policy input parameters comprise of a policy related parameter, a legacy application transformation, and a post quantum cryptography (PQC) algorithm vulnerability, wherein the PQC algorithm vulnerability parameters represent a risk condition and an associated impact on the migration, the risk condition being based on vulnerability information associated with at least one PQC algorithm as identified by a recognized standards or analysis authority.

12. The system of claim 7, wherein the one or more hardware processors are configured to determine Mosca risk value of the host enterprise application using the rule of Mosca, according to a relation:

$$Moscariskvalue = Z - (X + Y)$$

wherein Z is the time by which quantum computer manufactured with sufficient qubits, which breaks the predefined crypto scheme, X is the data shelf life of application related data of the host enterprise application, and Y is the time to migrate the host enterprise application.

13. One or more non-transitory machine-readable information storage mediums comprising one or more instructions which when executed by one or more hardware processors cause:

defining one or more application risk input parameters, one or more platform risk input parameters, and one or more risk policy input parameters, for a host enterprise application;

receiving an application related data of the host enterprise application, a data shelf life of the application related data of the host enterprise application, a time to migrate the host enterprise application whose risk is to be estimated from a quantum threat after migration, and a time by which a quantum computer manufactured;

extracting an input parameter value of each of the one or more application risk input parameters, the one or more platform risk input parameters, and the one or more risk policy input parameters, from the application related data of the host enterprise application whose risk is to be estimated from the quantum threat, using a data extraction technique, wherein a code parser is configured to fetch the input parameter value of an user type and a validity by analyzing an user access policy related data, and wherein the input parameter value corresponding to a vulnerability is extracted from an audit report or from vulnerability information generated during an application testing phase, and wherein the input parameter value associated with validity of a third party library is fetched based on dependency information of one or more third party libraries present in the host enterprise application;

computing a hazard value for each of the one or more application risk input parameters, the one or more platform risk input parameters, and the one or more risk policy input parameters, based on an associated input parameter value, using a modified cox model, wherein computing the hazard value for each of the one or more application risk input parameters, the one or more platform risk input parameters, and the one or more risk policy input parameters, based on the associated input parameter value, using the modified cox model, comprising:

receiving a number of qubits of a quantum computer, and a number of qubits needed to break a predefined cryptographic scheme defined for the host enterprise application, of one or more predefined cryptographic schemes;

determining a quantum hazard value, based on the number of qubits of the quantum computer and the number of qubits needed to break a predefined cryptographic scheme defined for the host enterprise application;

determining a partial likelihood function value for each of the one or more application risk input parameters, the one or more platform risk input parameters, and the one or more risk policy input parameters, using the modified cox model, by estimating a probability of attack on the predefined cryptographic scheme for a current instance with respect to one or more historical instances that are vulnerable to computing capability of the quantum computer; and calculating the hazard value for each of the one or more application risk input parameters, the one or more platform risk input parameters, and the one or more risk policy input parameters values, using the quantum hazard value, an associated partial likelihood function value and the associated input parameter value;

estimating a hazard risk value of the host enterprise application, based on the hazard value computed for each of the one or more application risk input parameters, the one or more platform risk input parameters, and the one or more risk policy input parameters;

determining a Mosca risk value of the host enterprise application, based on the data shelf life of application related data of the host enterprise application, the time to migrate the host enterprise application, and the time by which quantum computer manufactured, using a rule of Mosca;

calculating a cumulative risk value of the host enterprise application, using the hazard risk value of the host enterprise application and the Mosca risk value of the host enterprise application;

evaluating the risk of the host enterprise application for quantum cryptography migration, based on the cumulative risk value of the host enterprise application and an average cumulative risk value, wherein evaluating the risk the host enterprise application for quantum cryptography migration, based on the cumulative risk value of the host enterprise application and the average cumulative risk value, comprising:

(i) assigning the host enterprise application with a high priority and allowing a migration of the host enterprise application when the cumulative risk value of the host enterprise application is higher than the average cumulative risk value; and (ii) assigning the host enterprise application with a low priority and postponing the migration of the host enterprise application when the cumulative risk value of the host enterprise application is less than or equal to the average cumulative risk value; and performing the quantum cryptography migration based on the evaluated risk of the host enterprise application.

* * * * *